United States Patent [19]

Graffin

[11] Patent Number: 5,027,932
[45] Date of Patent: Jul. 2, 1991

[54] TIGHTENING DEVICE HAVING ADJUSTABLE CLAMPING TORQUE

[75] Inventor: Jean-Jacques Graffin, La Ferte Bernard, France

[73] Assignee: Etablissements A. Bertaud, Vitrolles, France

[21] Appl. No.: 489,032

[22] Filed: Mar. 6, 1990

[30] Foreign Application Priority Data

Mar. 10, 1989 [FR] France ............................... 89 03161

[51] Int. Cl.$^5$ ..................... F16D 43/28; F16D 3/82
[52] U.S. Cl. .................................. 192/56 F; 192/150
[58] Field of Search ................ 192/56 F, 150; 81/473, 81/474, 476; 173/12; 53/331.5; 464/46

[56] References Cited

U.S. PATENT DOCUMENTS

| | | | |
|---|---|---|---|
| 3,491,516 | 1/1970 | Bergeron | ............................. 53/317 |
| 3,834,467 | 9/1974 | Fuchs | .................................... 192/150 |
| 4,222,215 | 9/1980 | Takano | ............................... 53/331.5 |
| 4,558,554 | 12/1985 | Herbert | ............................. 53/331.5 |
| 4,836,349 | 6/1989 | Sakamoto et al. | ................. 192/56 R |
| 4,884,670 | 12/1989 | McCormick et al. | ............ 192/56 F |

FOREIGN PATENT DOCUMENTS 948146  1/1964  United Kingdom .

*Primary Examiner*—Allan D. Herrmann
*Assistant Examiner*—Andrea Pitts
*Attorney, Agent, or Firm*—Griffin Branigan & Butler

[57] ABSTRACT

A tightening device of the invention comprises a transmission device comprising a first transmission member, a second transmission member mounted coaxially with the first transmission member between an abutment and a thrust member, at least one torque limiter member disposed between the second transmission member and the abutment or the thrust member, a first adjustable resilient member acting on the thrust member, and a second adjustable resilient member acting on the thrust member independently of the first resilient member and in the same direction as the first resilient member.

6 Claims, 1 Drawing Sheet

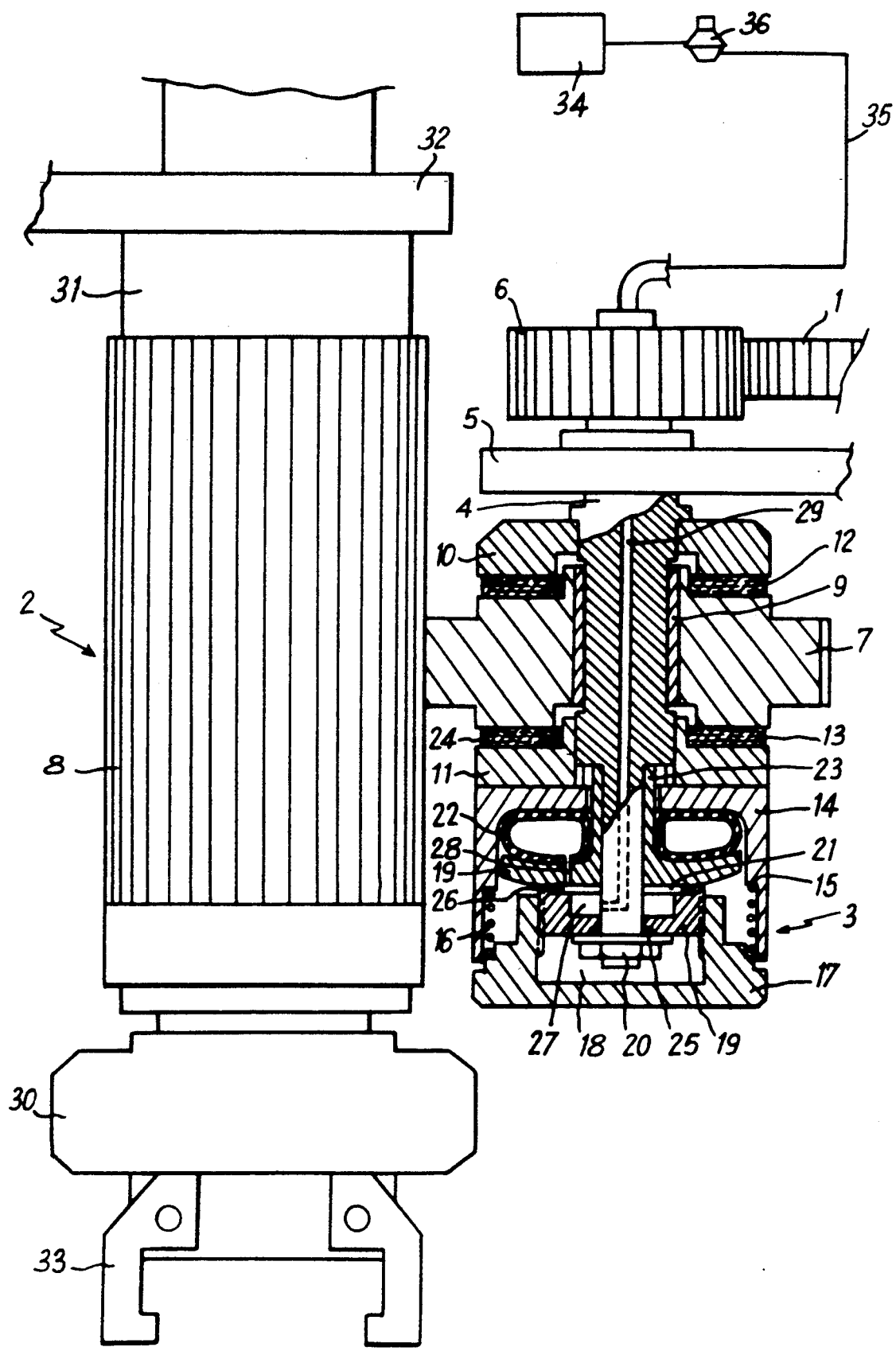

TIGHTENING DEVICE HAVING ADJUSTABLE CLAMPING TORQUE

The present invention relates to a tightening device having adjustable clamping torque.

The tightening device of the invention is particularly, but not exclusively, adapted to tightening a screw cap on the neck of a bottle, in particular a bottle made of plastic material.

BACKGROUND OF THE INVENTION

In conventional manner, such a device comprises a plurality of tightening spindles rotated by a drive member via adjustable torque-limiting transmission devices so that bottles of various types requiring their caps to be tightened to a greater or lesser extent without running the risk of damaging the bottles can be closed optimally.

In known tightening devices, the torque-limiting transmission devices comprise a first transmission member, a second transmission member mounted coaxially with the first transmission member to rotate relative thereto between an abutment fixed to the first transmission member and a thrust member constrained to rotate with the first transmission member and movable relative thereto in a direction parallel to an axis of rotation of the transmission members, at least one torque-limiting member being disposed between the second transmission member and the abutment or thrust member, and an adjustable resilient member carried by the first transmission member and acting on the thrust member in a direction tending to urge it towards the abutment. When an installation includes a plurality of tightening spindles, each associated with a transmission device, it is necessary to adjust each of the transmission devices individually each time the type of bottle or the type of cap is changed. This adjustment operation is fiddly and considerably reduces the throughput of the tightening installation. In addition, given the rate at which tightening machines operate, it is generally not possible to perform this adjustment while the machine is in operation, thereby requiring the machine to be stopped. Further, each time an adjustment is performed, it is necessary to perform the adjustment by adapting it to characteristics specific to each transmission device, in particular the wear of the torque-limiting member.

An object of the invention is to propose a tightening device capable of two adjustments: one of the adjustments being intended to match the torque-limiting characteristics of the various transmission devices in an installation, while the second adjustment is performed identically on all of the transmission devices in order to adapt them to a particular type of cap or a particular type of bottle.

Another object of the present invention is to provide a tightening device comprising a plurality of tightening spindles in which the tightening torque of the set of spindles can be changed by a single adjustment operation.

SUMMARY OF THE INVENTION

In order to achieve the first object mentioned above, the invention provides a tightening device including transmission devices of the type outlined above in which each of the transmission devices includes a first adjustable resilient member carried by the first transmission member and acting on the thrust member urging it towards the abutment, and a second adjustable resilient member acting on the thrust member independently from the first resilient member and in the same direction. Thus, when adjusting each of the resilient members, the torque limit of the transmission device is changed independently from the torque limit imparted thereto by adjusting the other resilient member. In particular, the adjustment of one of the resilient members may be used for matching the tightening torques of the various transmission devices in a multi-spindle installation, whereas the adjustment of the other resilient member is performed simultaneously on the set of transmission devices in order to adapt them to a particular type of cap.

In an advantageous version of the invention, the second resilient member comprises a sealed expansible chamber fed with a fluid under pressure, with the expansible chamber preferably being constituted by a substantially toroidal inflatable tube coaxial with the first transmission member. This makes it possible to obtain very fine adjustment. In addition, by connecting a set of expansible chambers to a common source of fluid under pressure, simultaneous adjustment of the set of transmission devices is obtained immediately.

BRIEF DESCRIPTION OF THE DRAWING

An embodiment of the invention is described by way of example with reference to the accompanying drawing, in which the sole accompanying FIGURE which is a fragmentary elevation view partially in vertical section through a tightening device of the invention.

DETAILED DESCRIPTION

With reference to FIG. 1, the tightening device comprises a toothed ring 1 forming a drive member for a plurality of tightening spindles 2 to which the motion of the toothed ring 1 is transmitted via respective transmission devices 3. Each transmission device 3 comprises a shaft 4 mounted to rotate in a frame element 5.

The top end of the shaft 4 carries a first gear wheel 6 meshing with the toothed ring 1. The middle portion of the shaft 4 which constitutes a first transmission member carries a gear wheel 7 mounted coaxially with the shaft 4 in order to rotate relative thereto. The gear wheel 7 constitutes a second transmission member of the transmission device 3. The gear wheel 7 meshes with a fluted surface 8 of the tightening spindle 2 in order to rotate the spindle when it is itself rotated. The gear wheel 7 is mounted to rotate freely and move freely in translation relative to the shaft 4 by means of a ball-bearing or a self-lubricating ring 9. The gear wheel 7 is disposed between an abutment 10 which is constrained in rotation and in translation on the shaft 4 and a thrust member 11 which is constrained to rotate with the shaft 4 but which is movable relative thereto in a direction parallel to the axis of rotation of the shaft 4.

In the embodiment shown, the transmission device comprises a friction member 12 disposed between the gear wheel 7 and the abutment 10, and a friction member 13 disposed between the gear wheel 7 and the thrust member 11. The friction members 12 and 13 may be constituted by annular gaskets of material having a high coefficient of friction, or by any other torque-limiting member, e.g. a magnetic device or a ball-bearing device for limiting the torque transmitted between the thrust member 11 and the gear wheel 7. In any of these cases, one of the friction members 12 or 13 may be replaced by a ball abutment for providing frictionless contact between one of the faces of the gear wheel 7 and either the abutment 10 or the thrust member 11.

The transmission device includes a bell-shaped piston 14 disposed against the face of the thrust member 11 facing away from the friction member 13, the piston 14 being coaxial with the shaft 4 and free to move relative thereto in an axial direction. The bell-shaped piston 14 includes an inside shoulder 15 having one end of a helical compression spring 16 bearing thereagainst, the spring thus forming a first resilient member. The end of the compression spring 16 furthest from the shoulder 15 bears against an adjustment nut 17 having a shoulder and also including a tapped cavity 18 mounted on an outside thread of an annular cup 19 itself fixed by means of a nut 20 on the end of the shaft 4 furthest from its end carrying the gear wheel 6.

The edge of the cup 19 bears against an end face 21 of a mushroom-shaped support member 23 mounted coaxially on the shaft 4 and bearing against a shoulder 24 on the shaft 4. A substantially toroidal inflatable tube 22 made of rubber, for example, forms a second resilient member mounted coaxially with the shaft 4 between the support member 23 and the inside surface of the bell-shaped piston 14. The annular cup 19 is mounted in sealed manner on the shaft 4 by means of an O-ring 25 and sealing is provided between the cup 19 and the support member 23 by an O-ring 26. The cup 19 thus delimits a sealed annular manifold chamber 27 into which there is opened firstly a duct 28 formed through the support member 23 and communicating with the inside of the inflatable tube 22, and secondly a duct 29 passing inside the shaft 4 and connected to a source of fluid under pressure 34, e.g. a cylinder of compressed air, via pipework 35 including an expander 36.

The tightening spindle 2 includes a tightening head 30 mounted at the end of an elongate body 31 carrying the fluted surface 8. It is mounted to rotate freely about its longitudinal axis on an actuator frame 32 connected elsewhere to actuator means (not shown) for the purpose of displacing the tightening spindle 2 vertically. The tightening head 30 is provided with jaws 33 actuated by a mechanism received in the tightening head 30 for grasping a screw cap and for preventing it rotating relative thereto while it is being screwed onto the neck of a bottle.

The tightening device of the invention operates as follows: the pressure in the inflatable tube 22 forming the expansible chambers is adjusted to an arbitrary pressure by means of the expander 36 which is preferably common to the entire set of transmission devices in a single installation, and the limiting tightening torque of each transmission device is tested. When the limiting clamping torque of one of the transmission device is different from the others, the nut 17 is acted upon in order to increase or reduce the extent to which the associated spring 16 is compressed, thereby bringing the limiting tightening torque of the transmission device in question to the same value as the other transmission devices. During this operation, the inflatable tube 22 may optionally be completely deflated.

When all of the transmission devices have been adjusted to the same limiting torque value, the air pressure inside the inflatable envelope 22 is adjusted to obtain the desired tightening torque in all of the transmission devices appropriate for the type of cap that is to be utilized, and the installation is put into operation.

If the type of cap is changed while the installation is in operation, or if it is desired merely to modify the tightening torque applied to the caps for any reason whatsoever, it suffices to act on the common expander in order to adjust all of the transmission devices in the installation instantaneously. In this context, it will be observed that the expander 36 is preferably associated with a fixed portion of the installation and that the pipework 35 includes a rotary joint (not shown) enabling the inflatable tubes 22 associated with moving portions of the installation to be supplied continuously with compressed air.

It may be observed that the spring 16 and the inflatable tube 22 act in parallel with each other on the bell-shaped piston 14. In the event of a failure in the compressed air feed system, it is therefore possible to continue using the installation by performing individual manual torque adjustment on each of the transmission devices 3 by acting on the adjustment nuts 17.

Naturally the invention is not limited to the embodiment described and variants may be applied thereto without going beyond the scope of the invention In particular, it is possible to incorporate the transmission device 3 in the tightening spindles 2, with the tightening head 30 being mounted, for example, at the bottom end of a shaft 4 extending through the adjustment nut 17, the gear wheel 6 then being omitted and the gear wheel 7 being in meshing contact with the toothed ring 1.

Similarly, the inflatable tube 22 may be replaced by an expansible chamber constituted by the bell-shaped piston 14 itself, in which case its inside volume is sealed by providing O-rings between the facing surfaces of the bell-shaped piston 14 and the support member 23. The piston 14 may also be made integrally with the thrust member 11.

I claim:

1. A tightening device having an adjustable tightening torque, the device comprising a drive member for rotating at least one tightening head via a transmission device connected both to the drive member and to the tightening head and including a first transmission member, a second transmission member mounted coaxially with the first transmission member in order to rotate relative thereto between an abutment fixed to the first transmission member and a thrust member constrained to rotate with the first transmission member and movable relative thereto in a direction parallel to an axis of rotation of the transmission members, at least one torque limiter disposed between the second transmission member and the abutment or between the second transmission member and the thrust member, and a first adjustable resilient member carried by the first transmission member and acting on the thrust member in a direction urging it towards the abutment, wherein the transmission devices includes a second adjustable resilient member acting on the thrust member independently from the first resilient member and in the same direction as the first resilient member.

2. A tightening device according to claim 1, wherein the second resilient member comprises a sealed expansible chamber fed with a fluid under pressure.

3. A tightening device according to claim 2, wherein the expansible chamber is constituted by a substantially toroidal inflatable tube coaxial with the first transmission member.

4. A tightening device according to claim 1, wherein the first resilient member is a helical spring disposed coaxially with the first transmission member between the thrust member and a compression-adjusting nut screwed onto the first transmission member.

5. A plurality of tightening devices according to claim 1, disposed in a tightening installation and comprising a series of tightening heads each associated with a transmission device and wherein the second resilient member of each transmission device is connected to a common adjustment member.

6. A plurality of tightening devices according to claim 5 disposed in a tightening installation, wherein the second resilient member comprises a sealed expansible chamber fed with air under pressure, and the expansible chamber in each transmission device is connected to a common expander.

* * * * *